Patented Jan. 18, 1938

2,105,701

UNITED STATES PATENT OFFICE 2,105,701

PROCESS FOR PURIFICATION OF BEVERAGES

William D. Ramage, Berkeley, Calif.

No Drawing. Application March 6, 1937,
Serial No. 129,473

7 Claims. (Cl. 99—48)

This application is a continuation in part of my pending application Serial No. 90,441, filed July 13, 1936.

This invention relates to a new process for the clarification of wine and other beverages and the removal of iron therefrom.

A part of the iron is removed from wines during the usual aging, clarification, and filtration processes. In some cases, however, it is very difficult to reduce the iron content low enough to avoid subsequent hazing or clouding. Multiple filtration at intervals of several weeks is sometimes used. In spite of this costly procedure, hazing may still occur and even the wine flavor may be adversely affected.

Sodium ferrocyanide and its related compounds are often added to difficult wines to facilitate the iron removal. This procedure effects complete removal of the iron when carefully done, but is open to a serious objection from a health standpoint. Under the usual method of procedure, an excess of soluble ferrocyanide is sometimes left in the wine and appreciable amounts of cyanide may result therefrom.

These and other disadvantages are eliminated by the use of the process which I have discovered. Since the iron removing agents which I use in practicing the process of my invention are all substantially insoluble materials, the possibility of leaving deleterious substances in the wine or other beverage is eliminated. In the specification and claims I have used the word "insoluble" in its conventional sense of "only slightly soluble."

The process involves the use of complex compounds which contain alkali or alkaline earth elements which are replaceable by iron and which are only slightly soluble in water. The removal of the iron from the solution is substantially a base exchange operation. Materials suitable for treating wine must be not only insoluble in water but also substantially insoluble in dilute acid solutions. This greatly limits the number of compounds suitable for treating wine, since compounds which are unstable or soluble may change the wine flavor.

I prepared an acid resistant zeolite by calcining an ordinary sodium zeolite and dispersed the zeolite in a wine having a pH value of 3.4, filtered the zeolite from the wine, and found that the treated wine contained less than four parts per million of iron.

I also prepared and used certain high silica acid resistant zeolites and found that they did not disintegrate in wine having an acidity of pH 3.5. However, they had a somewhat lower iron removing capacity (base exchange value) but not enough lower to impair their practical value for the process. In wines having an acidity greater than pH 3.5, I found that the base exchange values of most zeolites for iron decreased during use. For the treatment of such wines I recommend the use of high silica acid resistant zeolites or other base exchange compounds, for example, insoluble ferrocyanides, as disclosed in my above-mentioned copending application. However, even in wines having an acidity of pH 3.0, the acid resistant zeolites gave good results, and can be used satisfactorily if other methods are not available.

I have used ordinary commercial zeolites and have found that they give excellent results if the acidity of the wine does not attack the zeolite. However, ordinary commercial zeolites are attacked by the wine acidity if the acidity of the wine is greater than approximately pH 3.8, which varies with the zeolite used. In some cases the only effect of the acidity of the wine is a decrease in the base exchange value of the zeolite, whereas in other cases actual disintegration of the zeolite occurs, which causes a noticeable change in the wine flavor. The change in wine flavor is largely due to the increase in the concentration of soluble salts.

In addition to the acid resistant zeolites mentioned above, I have also found it feasible to use ordinary zeolites in the treatment of wines having an acidity greater than pH 3.8, when the zeolites are properly protected. It is convenient to accomplish this protection by first treating the zeolite with an iron solution and then with a ferrocyanide solution. This gives the adherent coating of insoluble ferrocyanide on the surface of the zeolite particles, which greatly inhibits the disintegrating action of the wine acids.

If a wine is treated with sodium zeolite, the calcium content of the wine will also be decreased. This does not interfere with the iron removal, since the calcium is in turn replaced by iron if all the sodium zeolite has been converted to calcium zeolite.

I have found that it is inadvisable to effect a material decrease in the calcium content of some wines, and have therefore used a calcium or magnesium zeolite in the treatment of these wines.

As already indicated, other base exchange compounds can be used, for example, ferrous ferrocyanide and its related compounds, as set forth in detail in my above-mentioned co-pending application. The ferrous ferrocyanide may also be precipitated on any one or a combination of a number of base materials to increase the ease of the subsequent clarification.

Alkaline earth silicates have also been used with good results in wines having an acidity of less than pH 3.5. Best results in the silicate group (with the exception of the zeolites) were obtained with a special acid resistant calcium silicate. The material was prepared by addition of an excess of a calcium chloride solution containing free acid to a high silica sodium silicate solution. After the precipitation and drying the product was calcined or fused.

Good results in the treatment of wines having an acidity less than pH 3.8 have also been obtained with the use of alkaline earth phosphates. However, the phosphates are less resistant to the action of the wine acids and decompose fairly rapidly when used in the treatment of wines having an acidity substantially greater than pH 3.8. In general, I have found that the alkaline earth phosphates are not as satisfactory for the treatment of wines as the other materials described herein, and are best adapted to be used in the treatment of beer and other less acid beverages.

In carrying out my process, the finely divided treating material was dispersed in the solution treated, the mixture agitated to secure good contact, and the treating material was then filtered, centrifuged or allowed to settle, either with or without the use of inert filter aids. In most cases I used the centrifuge which is ideally adapted to remove the finely divided treating material. It is apparent, however, that the materials may be used in the form of a bed, through which the wine or other solution is allowed to percolate. Beds may also be formed wherein the active treating material is mixed with inert filter aids, or alternate layers of filtering materials and iron removing agents may be employed.

I have found that from 0.05% to 1.0% of base exchange compound gives a satisfactory result, the amount required varying with the pH value of the wine, the time of contact, the degree of dispersion of the material in the wine, the amount of impurities to be removed, the temperature, and the base exchange value of the iron removing agent.

Any of the above materials is capable of reducing the iron content of a solution below 4 parts per million if the acidity of the solution is not greater than pH 3.8. If the acidity of the beverage to be treated is greater than pH 3.8, the more acid resistant treating agents should be used.

In general, I have found that wines treated by my process, in which a zeolite or an insoluble ferrocyanide was used as the iron removing agent, contained less than 2 parts per million of iron, and frequently less than 1 part per million of iron.

My process is applicable for the treatment of wines, whiskies, beers, ciders and other fermented or distilled beverages and fruit juices, and I have used the term "beverage" to include all of the foregoing.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects, which may be found useful in many other applications thereof.

I claim:

1. A process for removing soluble iron by base exchange from alcoholic beverages having a minimum acidity of pH 3.8 which comprises contacting the beverage with an acid resistant base exchange material.

2. A process for removing soluble iron by base exchange from alcoholic beverages having a minimum acidity of pH 3.8 which comprises contacting the beverage with an acid resistant base exchange material to produce a treated beverage containing less than six parts per million of iron.

3. A process for removing soluble iron from beverages having a minimum acidity of pH 3.8, by base exchange which comprises contacting the beverage with an acid resistant zeolite.

4. A process of treating alcoholic beverages having a minimum acidity of pH 3.8 which comprises contacting the beverage with an acid resistant zeolite whereby soluble iron is removed from the beverage by base exchange.

5. A process for removing soluble iron from alcoholic beverages having a minimum acidity of pH 3.8 by base exchange which comprises contacting the beverage with a high silica acid resistant zeolite.

6. A process for removing soluble iron from alcoholic beverages having a minimum acidity of pH 3.8 by base exchange which comprises contacting the beverage with a calcined acid resistant sodium zeolite.

7. A process for removing soluble iron from alcoholic beverages having a minimum acidity of pH 3.8 by base exchange which comprises contacting the beverage with an acid resistant alkaline earth silicate having base exchange properties.

WILLIAM D. RAMAGE.